(12) United States Patent
Bodapati (10) Patent No.: US 11,047,596 B1
(45) Date of Patent: Jun. 29, 2021

(54) HIGH TEMPERATURE FLUID GENERATOR

(71) Applicant: Superior Boiler, LLC, Richmond, VA (US)

(72) Inventor: Sundeep Bodapati, Richmond, VA (US)

(73) Assignee: Superior Boiler, LLC, Richmond, VA (US)

( * ) Notice: Subject to any disclaimer, the term of this patent is extended or adjusted under 35 U.S.C. 154(b) by 0 days.

(21) Appl. No.: 17/140,363

(22) Filed: Jan. 4, 2021

(51) Int. Cl.
*F24H 9/12* (2006.01)
*F24H 9/18* (2006.01)
*F24H 9/02* (2006.01)
*F24H 1/18* (2006.01)

(52) U.S. Cl.
CPC ............. *F24H 9/124* (2013.01); *F24H 1/186* (2013.01); *F24H 9/02* (2013.01); *F24H 9/1836* (2013.01)

(58) Field of Classification Search
CPC . F24H 9/124; F24H 1/186; F24H 9/02; F24H 9/1836
USPC ....................................................... 122/18.1
See application file for complete search history.

(56) References Cited

U.S. PATENT DOCUMENTS

| 2,142,612 | A |   | 1/1939  | Lucke           |            |
|-----------|---|---|---------|-----------------|------------|
| 2,849,989 | A |   | 9/1958  | Vorkauf         |            |
| 2,860,612 | A |   | 11/1958 | Durham          |            |
| 3,081,749 | A |   | 3/1963  | Stabenow        |            |
| 3,237,611 | A |   | 3/1966  | Stabenow        |            |
| 3,731,738 | A | * | 5/1973  | Cooper          | F28F 21/082 |
|           |   |   |         |                 | 165/180    |
| 4,196,700 | A |   | 4/1980  | Keseru et al.   |            |
| 5,273,003 | A | * | 12/1993 | Rothwell        | F22B 37/146 |
|           |   |   |         |                 | 110/264    |
| 5,915,468 | A |   | 6/1999  | Inoue et al.    |            |
| 6,901,887 | B2|   | 6/2005  | English         |            |
| 9,897,309 | B2|   | 2/2018  | Vasudevan       |            |
| 10,197,266 | B2|  | 2/2019  | Gauthier        |            |
| 10,704,783 | B2|  | 7/2020  | Gauthier et al. |            |
| 2017/0023240 | A1 | | 1/2017 | Gauthier et al. |            |
| 2020/0103142 | A1 | | 4/2020 | Se et al.       |            |

FOREIGN PATENT DOCUMENTS

| CH | 587442 A5  | 4/1977  |
| DE | 2314527 A1 | 10/1974 |
| GB | 1167002 A  | 10/1969 |

OTHER PUBLICATIONS

Victory Energy, High Temp Fluid Generator, Genesis series, from www.victoryenergy.com.

* cited by examiner

*Primary Examiner* — Kenneth J Hansen
*Assistant Examiner* — John E Bargero
(74) *Attorney, Agent, or Firm* — Williams Mullen; Thomas F. Bergert (57) ABSTRACT

Embodiments of a high temperature fluid generator are adapted to heat a fluid to a high temperature using a heat source. The generator employs a forced circulation counter flow design including a furnace section, a convection section and a pair of L-shaped headers connected to tubes in the furnace and convection sections. In various embodiments, the headers are positioned on diagonally opposite corners and convection tubes are positioned at least partially outside of a flue path for the combustion gas.

20 Claims, 6 Drawing Sheets

HIGH TEMPERATURE FLUID GENERATOR

TECHNICAL FIELD

The present disclosure pertains to high temperature fluid generators, and more particularly to a high temperature fluid generator providing improved efficiencies and compact operation.

BACKGROUND AND SUMMARY

High temperature fluid generators, such as boilers, have a variety of applications such as heating water and other fluids for residential and commercial use. Once a generator is constructed and installed, the generator elements are essentially fixed and difficult or potentially dangerous to access, which can present problems when attempting to inspect or service elements such as convection tubes. In addition, generators can be costly, heavy and large, which can limit their applications.

Existing generator designs require complex tube shapes and longer tubes, making it difficult to fabricate and install. The convection tubes and furnace tubes are typically welded together to make longer tubes in the tube network with the weld seams often in the flue gas path creating a possible point of failure. Also, the traditional tangent tube furnace construction has the potential for flue gas leak and requires a larger maintenance area due to longer tube lengths.

The present disclosure relates to a high temperature fluid generator including a forced circulation counter flow design. Embodiments of the present design use shorter furnace tubes resulting in faster fabrication and require a smaller maintenance area. The membrane tube construction of the furnace of presently disclosed embodiments also eliminates flue gas leaks. Further, the convection tube weld seam on the 180° bends of the present disclosure are outside the flue gas path in various embodiments, thereby reducing the potential weld failure and enabling ease of inspection and maintenance.

In various embodiments, two headers are provided on opposite corners and connected to a network of tubes in convection and furnace sections of the generator. According to the embodiments disclosed herein, a more compact and cost-efficient generator is provided.

A single or multiple tube streams with membrane construction can connect the two headers in the furnace. Similarly, single or multiple tube streams are used in the convection section. Depending on the flue gas temperature, the convection section consists of bare tubes, stainless steel fin tube and/or carbon steel fin tubes. Using the fin tubes in the convection section enables maximization of the heat transfer which can eliminate the need for an economizer.

The combusted flue gas from the furnace section enters the convection section either at the rear bottom or rear top of the furnace depending on the number of flue gas passes in the convection section. The flue gas makes a minimum of one pass and exits the generator on the top. In the case of multiple flue gas passes, the flue gas flow is streamlined using a combination of tubes and insulation board to act as a baffle.

In various embodiments, the fluid inlet is located on or near the top rear wall, and the fluid outlet on or near the front wall or to the front side of the generator. The fluid enters through the carbon steel fin tubes section followed by stainless steel fin tubes and exits the convection section through the bare tubes, the fluid makes the final pass through the furnace membrane tubes before exiting the generator. The fluid flow passes in the generator can be achieved by utilizing baffles in the headers.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can incorporate a controller having a processor and an associated memory storing instructions that, when executed by the processor, cause the processor to perform operations as described herein. It will be appreciated that reference to "a", "an" or other indefinite article in the present disclosure encompasses one or more than one of the described element. Thus, for example, reference to a tube encompasses one or more tubes, reference to an opening encompasses one or more openings, and so forth.

Figure 1:
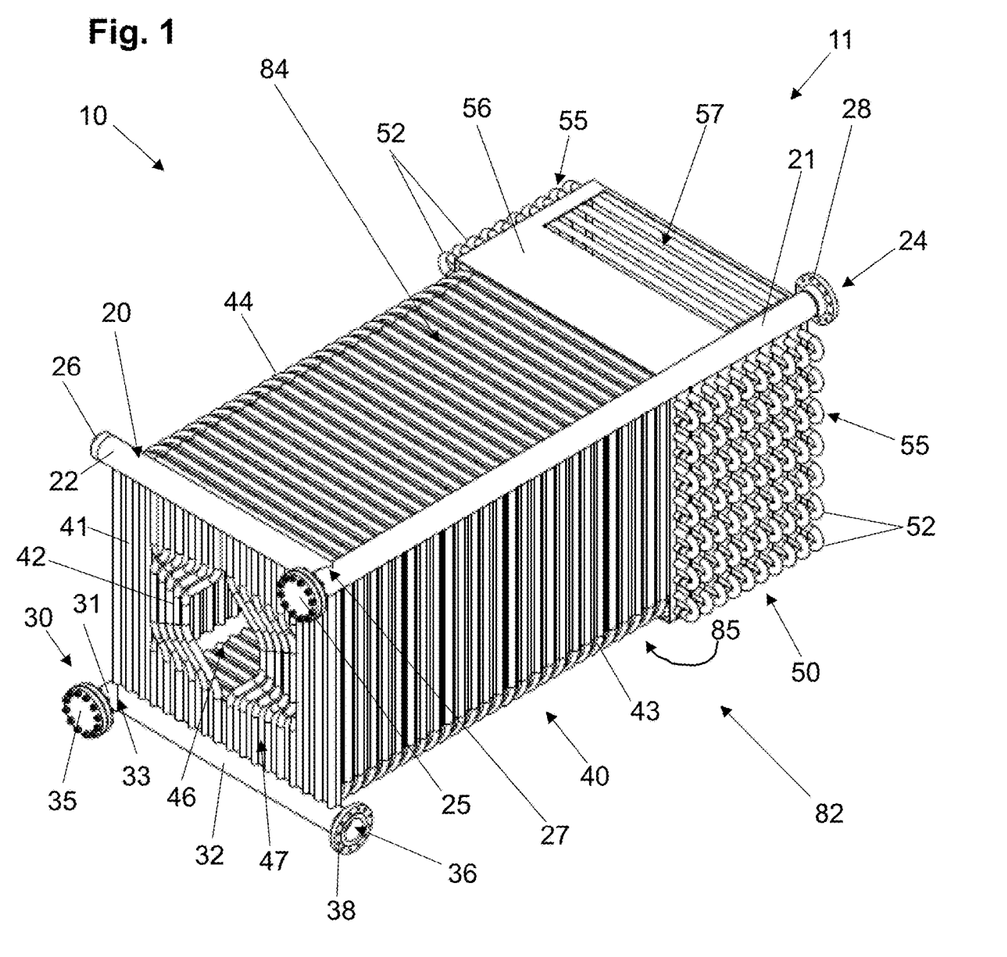
FIG. 1 is a front perspective view of an exemplary high temperature fluid generator in accordance with embodiments of the present disclosure.
Figure 2:
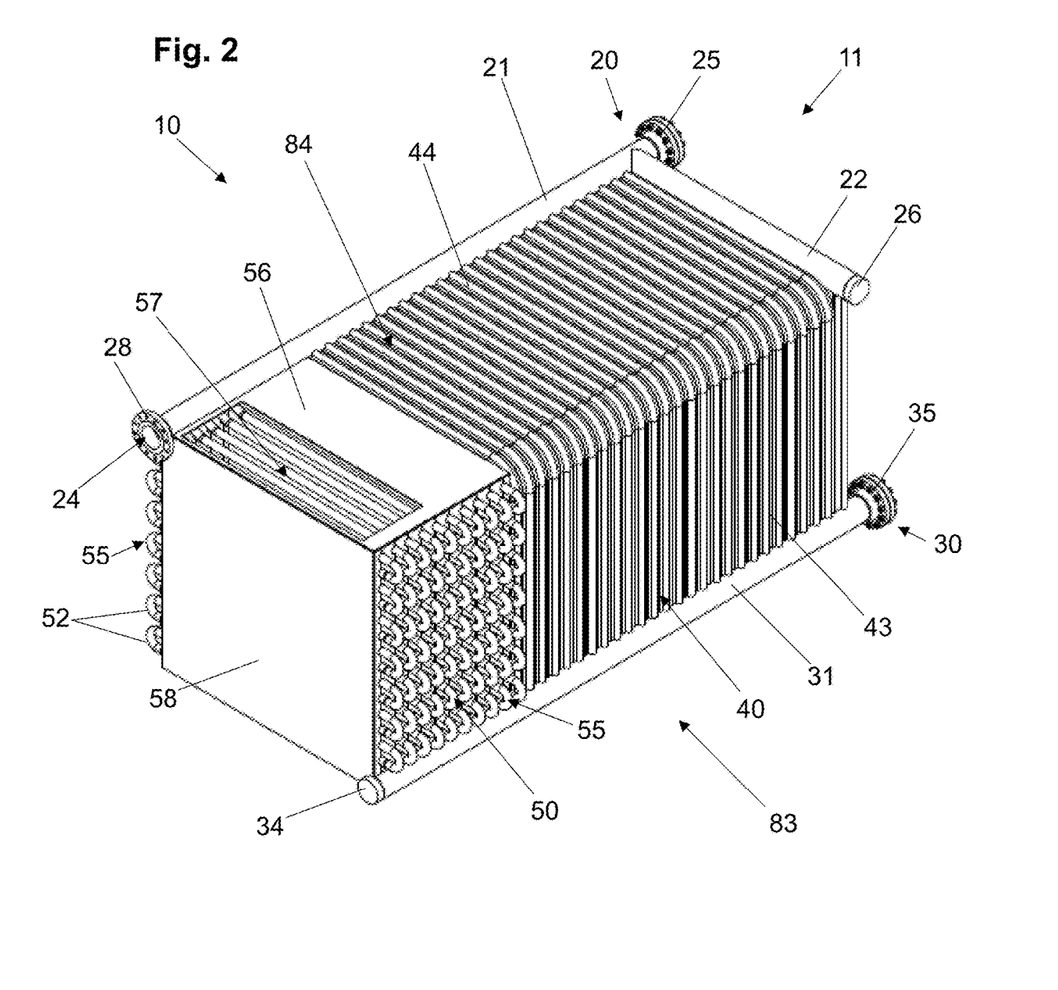
FIG. 2 is a rear perspective view of the fluid generator of FIG. 1.
Figure 3:
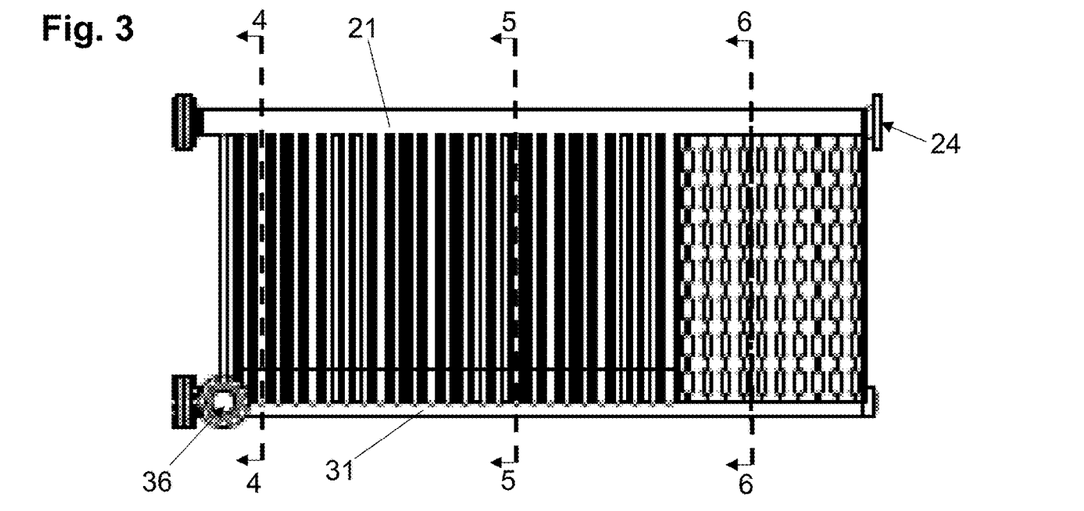
FIG. 3 is a side elevational view of the fluid generator of FIG. 1.
Figure 4:
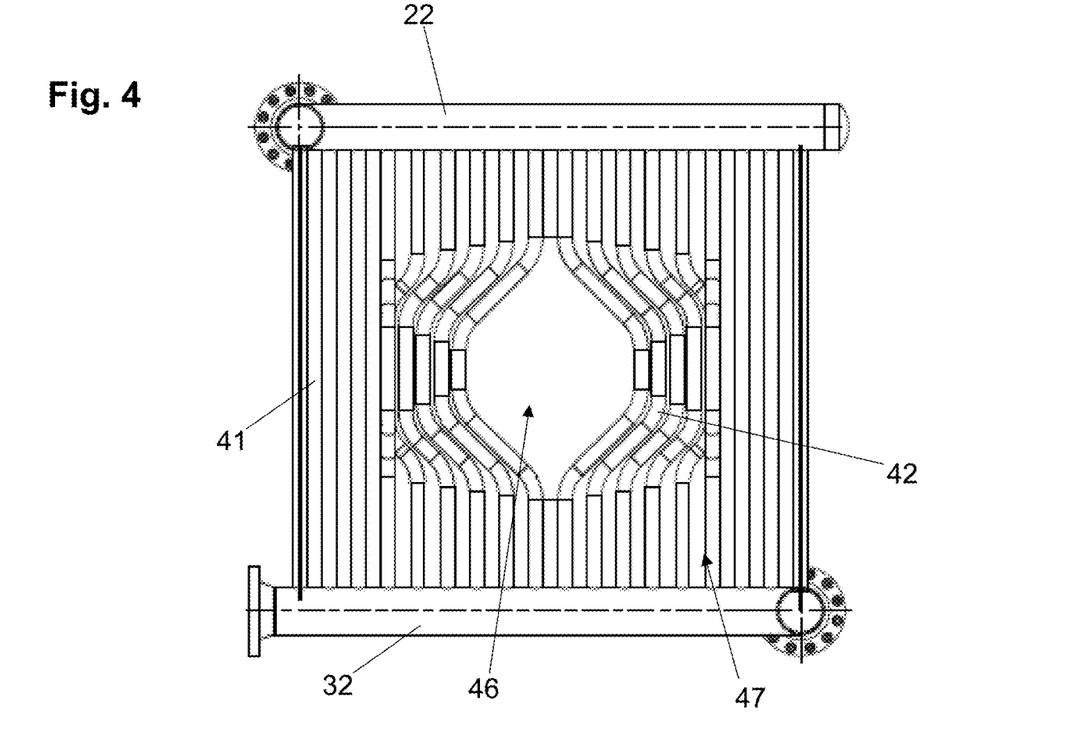
FIG. 4 is right cross-sectional view of the fluid generator taken along line 4-4 of FIG. 3.
Figure 5:
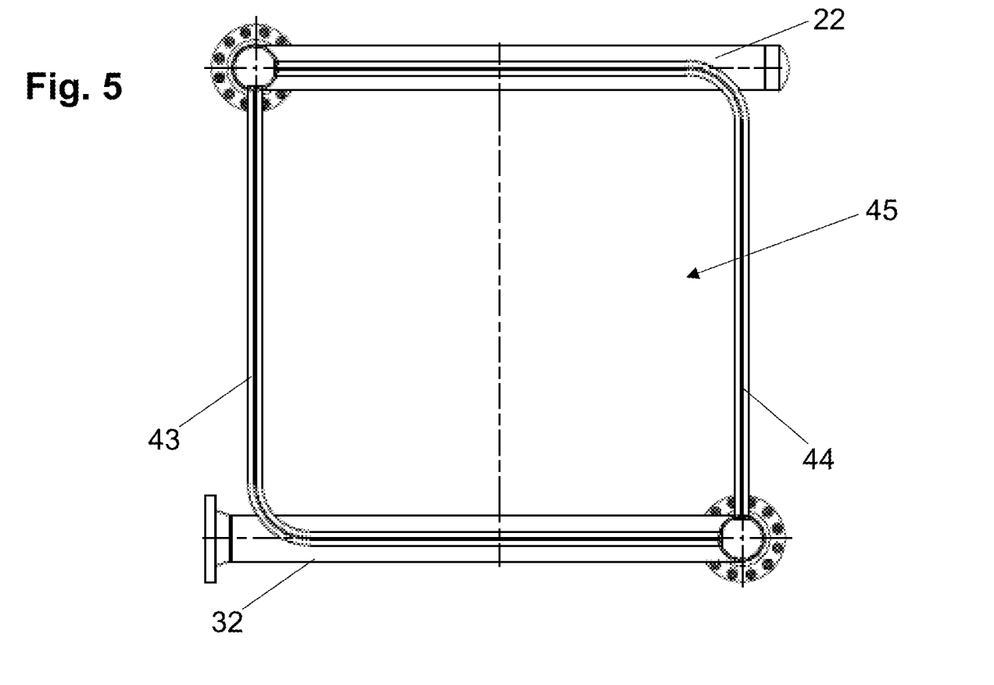
FIG. 5 is right cross-sectional view of the fluid generator taken along line 5-5 of FIG. 3.
Figure 6:
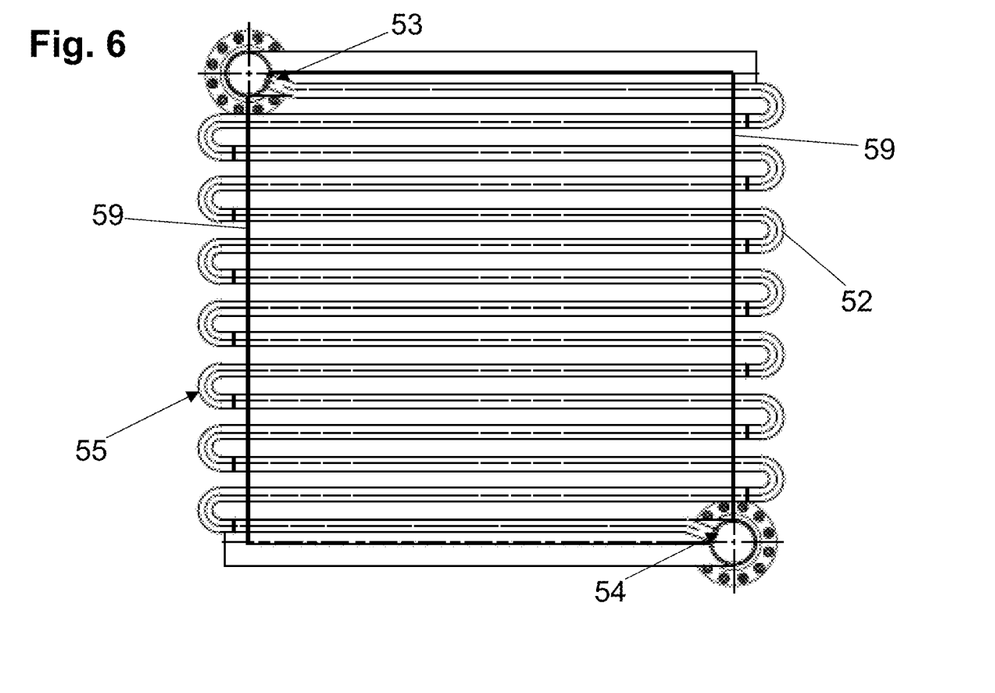
FIG. 6 is right cross-sectional view of the fluid generator taken along line 6-6 of FIG. 3.
Figure 7:
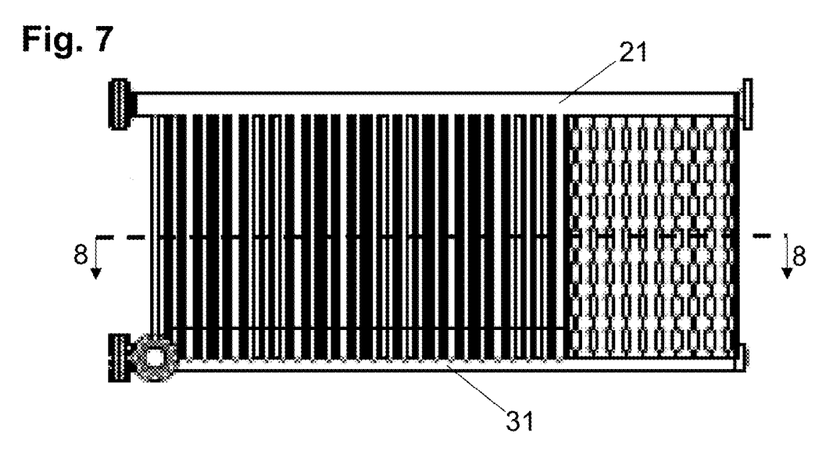
FIG. 7 is a side elevational view of an exemplary high temperature fluid generator in accordance with embodiments of the present disclosure.

As shown in FIGS. 1 and 2, embodiments of the present disclosure include a high temperature fluid generator 10 including a top header 20 and a bottom header 30, a furnace section 40 and a convection section 50. The top header 20 can be substantially L-shaped, with a primary segment 21 and a secondary segment 22 connected to and extending substantially perpendicularly from one another. The primary segment 21 has an inner surface defining a cavity extending from a fluid inlet 24 to an end cap 25. The secondary segment 22 is secured to the primary segment 21 at a position 27 proximate to the end cap 25. The secondary segment 22 has an inner surface defining a cavity extending from the position 27 where the secondary segment 22 intersects with the primary segment 21 to a secondary segment end cap 26. As such, the primary segment 21 and secondary segment 22 are in fluid communication with one another. The primary segment 21 can be provided with a securing flange 28 at the fluid inlet 24 to permit a ready connection of the primary segment 21 to further conduit elements to thereby control the direction of fluid entering the fluid inlet 24.

As shown in FIGS. 1 and 2, the bottom header 30 can be substantially L-shaped, with a first segment 31 and a second segment 32 connected to and extending substantially perpendicularly from one another. The first segment 31 has an inner surface defining a cavity extending from a back end cap 34 to a front end cap 35. The second segment 32 is secured to the first segment 31 at a position 33 proximate to the front end cap 35. The second segment 32 has an inner surface defining a cavity extending from the position 33 where the first segment 31 intersects with the second segment 32 to a fluid outlet 36. As such, the first segment 31 and second segment 32 are in fluid communication with one another. The second segment 32 can be provided with a securing flange 38 at the fluid outlet 36 to permit a ready connection of the second segment 32 to further conduit elements to thereby control the direction of fluid leaving the fluid outlet 36. In various embodiments, the first segment 31 of the bottom header 30 is diagonally opposed from the primary segment 21 of the top header 20 in the overall configuration of the generator 10. The diagonal header arrangement has various advantages. For example, equal furnace tube lengths encourage balanced fluid flow resulting in uniform heat transfer. Further, shorter furnace tubes enable faster fabrication and installation, thus reducing the overall construction cost. In addition, the maintenance area is smaller due to ease of access from both sides (e.g., 82, 83) of the generator. Embodiments incorporating the diagonal header arrangement further have a centralized center of gravity due to the symmetrical furnace and convection tube profile, resulting in easier handling and shipping. Also, when working with limited side access, the tubes can be removed from the top of the generator.

As shown in FIGS. 1-5 and 7-9, the furnace section 40 includes various furnace membrane tubes 41, 42, 43, 44 secured to the top header 20 and the bottom header 30 so as to define an internal furnace area 45. The tubes 41, 42, 43, 44 can be secured to the headers 20, 30 through welding, for example. Tubes 41, 42 can be positioned as part of a front wall 47 of the generator 10, wherein tubes 41 are linear tubes and tubes 42 are bent tubes. Both sets of linear 41 and bent tubes 42 extend from the secondary segment 22 of the top header 20 to the second segment 32 of the bottom header 30. In various embodiments, each of the linear tubes 41 has an inner surface defining a cavity that permits fluid communication between each linear tube 41, the secondary segment 22 and the second segment 32. Further, in various embodiments, each of the bent tubes 42 has an inner surface defining a cavity that permits fluid communication between each bent tube 42, the secondary segment 22 and the second segment 32. The bent tubes 42 are arranged to form an opening 46 whereby heat and/or a flame from a heat source 75 such as a burner can be directed to initiate combustion gas flow during operation. Tubes 43, 44 are substantially L-shaped and can be arranged in series from a first end 70 of the internal furnace area 45 to a second end 72 of the internal furnace area 75. In various embodiments, each of the tubes 43, 44 has an inner surface defining a cavity that permits fluid communication between each tube 43, 44, the primary segment 21 of the top header 20 and the first segment 31 of the bottom header 30. A first series of tubes 43 extends vertically downwardly from the primary segment 21 of the top header 20 and horizontally to the first segment 31 of the bottom header 30. A second series of tubes 44 extends horizontally from the primary segment 21 of the top header 20 and vertically downwardly to the first segment 31 of the bottom header 30. It will be appreciated that embodiments of the presently disclosed device can operate whereby a single tube stream is employed in the furnace section 40 as opposed to multiple tube streams.

As shown in FIGS. 1-3 and 6-9, the convection section 50 includes various convection tubes 52 secured to the top header 20 and the bottom header 30. The tubes 52 can be secured to the headers 20, 30 through welding, for example. The convection tubes 52 have an inlet 53 secured to primary segment 21 of the top header 20 and an outlet 54 secured at the bottom to first segment 31 of the bottom header 30. In various embodiments, each of the tubes 52 has an inner surface defining a cavity that permits fluid communication between each tube 52, the primary segment 21 of the top header 20 and the first segment 31 of the bottom header 30. As fluid enters through the fluid inlet 24 of primary segment 21 during operation, at least a portion is directed through convection tube inlet 53 of each convection tube 52, traveling through the convection tube 52 to a convection tube outlet 54 and into the first segment 31 of the bottom header 30. In various embodiments, each convection tube 52 is formed with a series of bends 55 to provide a generally serpentine path for the fluid to follow during operation, wherein the majority of the path is in the flue path (99 in FIG. 9) and/or combustion gas path as noted elsewhere herein, but wherein the bends 55 are outside of the flue path 99. In such embodiments, each bend 55 can be more readily serviced, inspected and maintained by a technician. It will be appreciated that embodiments of the presently disclosed device can operate whereby a single tube stream is employed in the convection section 50 as opposed to multiple tube streams.

In various embodiments, and depending on the flue gas temperature, the convection tubes 52 can be formed of different materials, including bare tubes, stainless steel fin tubes and carbon steel fin tubes. In different embodiments, a portion of the convection tubes 52 in the convection section includes bare tubes, another portion of the convection tubes 52 in the convection section includes stainless steel fin tubes, and another portion of the convection tubes 52 in the convection section includes carbon steel fin tubes. Using the fin tubes in the convection section enables maximization of the heat transfer which can eliminate the need for an economizer. The different compositions of convection tubes 52 assists with appropriately managing the flue gas temperature. In some embodiments, the different compositions of convection tubes 52 are provided in the order of carbon steel fin tubes at the back-most section of the apparatus 11, followed by the stainless steel fin tubes and then the bare tubes at the area where the convection section 50 meets the furnace section 40 of the device 10. The fluid thus enters through the carbon steel fin tubes section followed by stainless steel fin tubes and exits the convection section through the bare tubes.

As shown in FIGS. 1 and 2, the generator 10 can be provided as a substantially rectangular prism-shaped apparatus 11 having a first side 82, a second side 83, a roof or top 84, a bottom 85, a front wall 47 and a back wall 58. In various embodiments, the top header 20, bottom header 30, furnace membrane tubes 43, 44 and convection tubes 52 form the substantially rectangular prism shape. The front wall 47 and back wall 58 can also assist in forming the substantially rectangular prism shape. The top 84 can be formed and or considered to include the top header 20, portions of furnace membrane tubes 44, portions of convection tubes 52 and a cover 56 extending above the convection tubes 52. In various embodiments, the cover 56 is formed with an opening 57 to allow combustion gases to escape during operation. In some embodiments, the cover 56 is formed with the back wall 58 and side walls 59 which can provide additional supporting structure for the convection tubes 52, for example. It will be appreciated that the fluid inlet 24 and fluid outlet 36 are positioned on the first side 82 of the apparatus 11, which can facilitate operation and positioning of external conduit elements (not shown) to be connected to the fluid inlet 24 and outlet 36. As shown in FIGS. 1 and 2, the primary segment 21 of the top header 20 can extend horizontally along the top 84 and the first side 82 and the secondary segment 22 of the top header 20 can extend horizontally along the top 84 and the front wall 47. Further, the first segment 31 of the bottom header 30 can extend horizontally along the bottom 85 and the second side 83 while the second segment 32 of the bottom header 30 can extend horizontally along the bottom 85 and the front wall 47. In various embodiments, the top header 20 and bottom header 30 extend horizontally along the apparatus 11.

Figure 8:
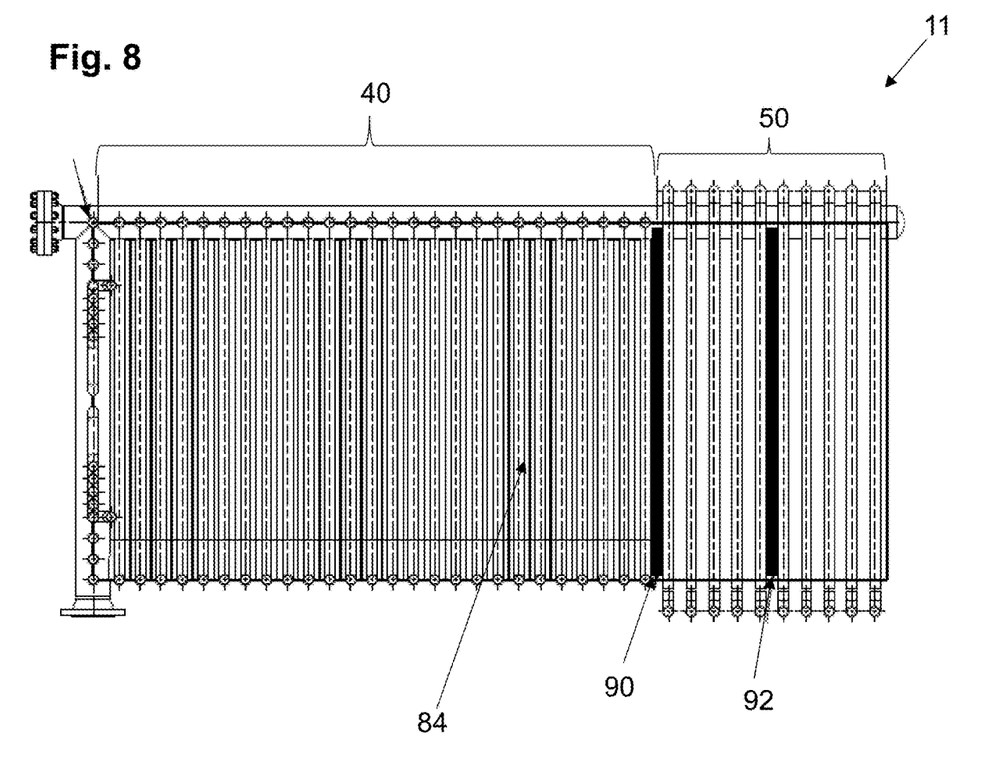
FIG. 8 is a top cross-sectional view of the fluid generator taken along line 8-8 of FIG. 7.
Figure 9:
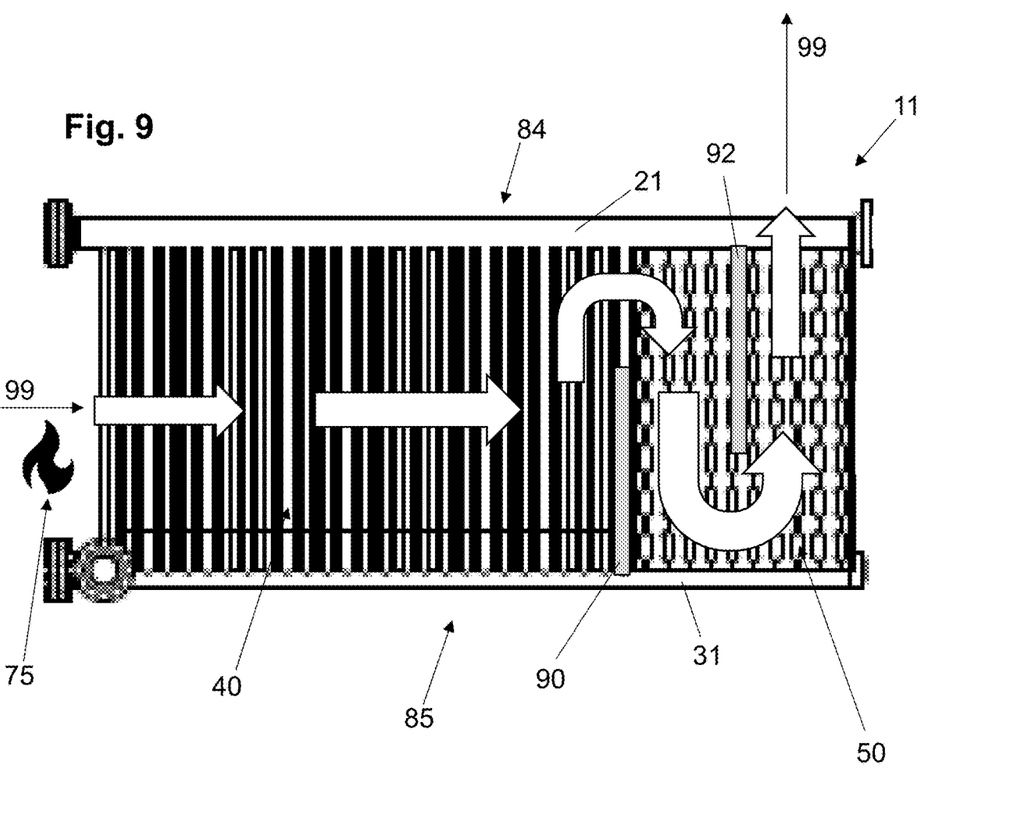
FIG. 9 is a side schematic view of an exemplary high temperature fluid generator in accordance with embodiments of the present disclosure, with arrows showing flue gas directional flow.

In operation, a heat source (indicated generally at 75 in FIG. 9) is provided external to the apparatus 11 and is adapted to generate a combustion gas and direct the combustion gas through the internal furnace area 40 of the device 10, such as through opening 46 in the front wall 47 and along a flue path 99. A fluid, such as water, for example, is forced through fluid inlet 24 in the primary segment 21 of the top header 20, whereupon the fluid flows through the primary segment 21, the network of convection tubes 52, first segment 31 of the bottom header 30, the network of furnace tubes 43, 44, the secondary segment 21 and the second segment 31 of the top 20 and bottom 30 headers, respectively, and the network of furnace tubes 41, 42 before exiting through the fluid outlet 36 in the bottom header 30. In various embodiments, circular baffles can be installed in the headers to direct fluid flow in the generator and to enhance the fluid side heat transfer rate. The fluid thus flows in a direction starting from the back side of the apparatus 11 toward the front wall 47, whereas the combustion gas flows from the heat source 75 through the internal furnace area 45 and convection section 50 of the apparatus 11. In various embodiments such as shown in FIGS. 8 and 9, internal baffle members 90, 92 are secured within the apparatus 11 to facilitate combustion gas flow. For example, a first internal baffle member 90 can be positioned between the furnace section 40 and the convection section 50 at or near the bottom 85 of the apparatus 11, whereas a second internal baffle member 92 can be positioned within the convection section 50 at or near the top 84 of the apparatus 11. In such embodiments, the flue path 99 thus begins from the heat source 75, extends through the furnace section 40, above and around first internal baffle member 90, below and around second internal baffle member 92, and then up through the combustion opening 57 in cover 56 (see FIG. 2). In various embodiments, the baffle members can be formed of insulation board materials and can be secured within the apparatus such as by studs on the convection tubes. The fluid in the tubes is thus heated as the flue gas passes around the tubes, and the fluid ultimately exits the apparatus 11 at the fluid outlet 36.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A high temperature fluid generator, comprising:
a substantially rectangular prism-shaped apparatus comprising a front wall, comprising:
a substantially L-shaped top header comprising a primary segment and a secondary segment extending substantially perpendicularly from the primary segment, wherein the top header is formed with a fluid inlet and wherein the secondary segment extends along the front wall;
a substantially L-shaped bottom header comprising a first segment and a second segment extending substantially perpendicularly from the first segment, wherein the first segment of the bottom header is diagonally opposed from the primary segment of the top header within the apparatus, wherein the bottom header is formed with a fluid outlet and wherein the second segment extends along the front wall in substantially parallel relation to the secondary segment;
a plurality of furnace membrane tubes secured to the top header and the bottom header so as to define an internal furnace area; and
a plurality of convection tubes secured to the top header and the bottom header; and
a heat source adapted to generate a combustion gas and direct the combustion gas through the internal furnace area.

2. The high temperature fluid generator of claim 1, wherein the plurality of furnace membrane tubes comprise a plurality of substantially L-shaped tubes arranged in series from a first end of the internal furnace area to a second end of the internal furnace area, wherein the plurality of substantially L-shaped tubes are maintained in fluid communication with the primary segment of the top header and the first segment of the bottom header.

3. The high temperature fluid generator of claim 2, wherein the plurality of substantially L-shaped tubes comprises a first series of tubes extending vertically downwardly from the primary segment of the top header and horizontally to the first segment of the bottom header.

4. The high temperature fluid generator of claim 3, wherein the plurality of substantially L-shaped tubes comprises a second series of tubes extending horizontally from the primary segment of the top header and vertically downwardly to the first segment of the bottom header.

5. The high temperature fluid generator of claim 1, wherein the plurality of furnace membrane tubes comprises a series of front wall tubes in fluid communication with the secondary segment of the top header and the second segment of the bottom header.

6. The high temperature fluid generator of claim 5, wherein the series of front wall tubes comprises a set of linear tubes and a set of bent tubes.

7. The high temperature fluid generator of claim 1, wherein the plurality of convection tubes comprises bare tubes, stainless steel fin tubes and carbon steel fin tubes.

8. The high temperature fluid generator of claim 7, wherein the combustion gas is directed through the apparatus along a flue path, wherein each of the plurality of convection tubes is formed with a plurality of bends, and wherein each of the plurality of bends are outside of the flue path.

9. The high temperature fluid generator of claim 1, wherein the fluid inlet and the fluid outlet are positioned along a first side of the apparatus.

10. The high temperature fluid e generator of claim 1, further comprising at least one baffle secured within the apparatus.

11. The high temperature fluid generator of claim 10, wherein the combustion gas is directed through the apparatus along a flue path including around the at least one baffle.

12. The high temperature fluid generator of claim 1, wherein the top header and bottom header extend horizontally along the apparatus.

13. The high temperature fluid generator of claim 1, wherein the plurality of convection tubes is in fluid communication with the primary segment of the top header and the first segment of the bottom header.

14. The high temperature fluid generator of claim 1, wherein the plurality of convection tubes comprises a convection tube inlet and a convection tube outlet, wherein the convection tube inlet is in fluid communication with the primary segment of the top header and wherein the convection tube outlet is in fluid communication with the first segment of the bottom header.

15. A high temperature fluid generator, comprising:
- a substantially L-shaped top header comprising a primary segment and a secondary segment, wherein the top header is formed with a fluid inlet;
- a substantially L-shaped bottom header comprising a first segment and a second segment, wherein the bottom header is formed with a fluid outlet;
- a plurality of furnace membrane tubes in fluid communication with the top header and the bottom header and arranged so as to define an internal furnace area;
- a plurality of convection tubes in fluid communication with the top header and the bottom header, wherein each of the plurality of convection tubes is formed with a plurality of bends;
- wherein the top header, bottom header, plurality of furnace membrane tubes and plurality of convection tubes form a substantially rectangular prism shape comprising a first side, a second side, a top, a bottom, a front wall and a back wall, and wherein the secondary segment of the top header and the second segment of the bottom header extend along the front wall in substantially parallel relation; and
- a heat source adapted to generate a combustion gas and direct the combustion gas through the generator along a flue path.

16. The high temperature fluid generator of claim 15, wherein the plurality of furnace membrane tubes is in fluid communication with the primary segment of the top header and the first segment of the bottom header.

17. The high temperature fluid generator of claim 15, wherein the plurality of convection tubes is in fluid communication with the primary segment of the top header and the first segment of the bottom header.

18. The high temperature fluid generator of claim 15, wherein the primary segment of the top header; extends along the top and first side of the prism shape to the secondary segment, and where the first segment of the bottom header extends along the bottom and second side of the prism shape to the second segment.

19. The high temperature fluid generator of claim 18, wherein the primary segment of the top header extends horizontally along the top and the first side and wherein the secondary segment of the top header extends horizontally along the top and the front wall.

20. The high temperature fluid generator of claim 19, wherein the first segment of the bottom header extends horizontally along the bottom and the second side and wherein the second segment of the bottom header extends horizontally along the bottom and the front wall.

* * * * *